Feb. 11, 1941. K. D. RICHARDS 2,231,507
FLY AND CONTROL THEREFOR
Filed April 1, 1940
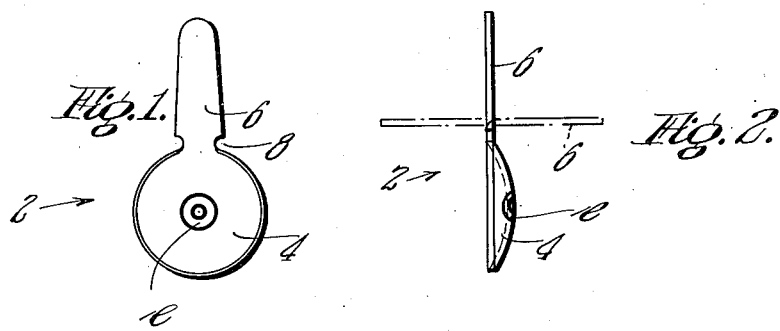
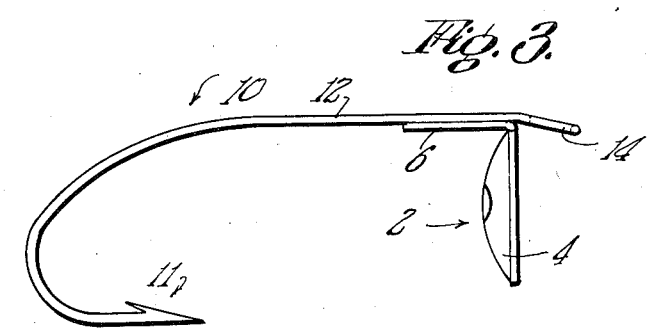
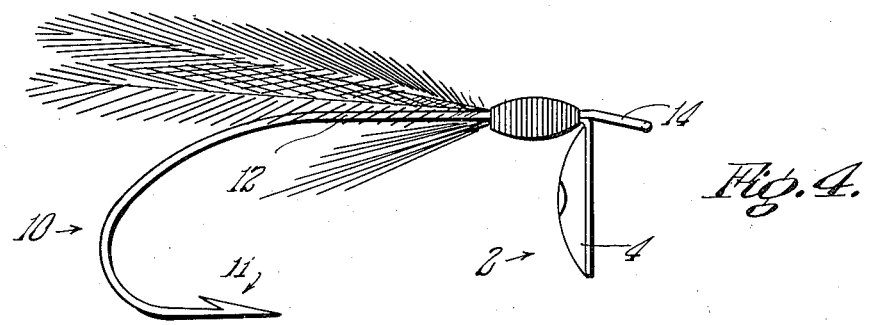
INVENTOR.
Kenneth D. Richards.
BY Walter C. Ross, Attorney.

Patented Feb. 11, 1941

2,231,507

UNITED STATES PATENT OFFICE 2,231,507

FLY AND CONTROL THEREFOR

Kenneth D. Richards, Winchendon, Mass.

Application April 1, 1940, Serial No. 327,215

2 Claims. (Cl. 43—42)

This invention relates to improvements in a fishing fly and control therefor.

It is a principal object of the invention to provide a novel control for a fishing fly which is adapted to cause the fly to shimmer as it is drawn through the water. That is to say, I provide a fly so controlled and constructed that it looks and acts somewhat like a shiner or minnow so as to attract larger fish.

As a special feature, the fly control of my invention may have the representation of an eye or eyes thereon and/or it may be of more or less shiny material, such as metal. As will appear, the fly is arranged so that when a strain is put on the line, the fly shimmers up and down as well as sideways.

In a general way the control of the invention consists of what I call a cup member which may be sold separately and attached to a fly by the purchaser or it may be permanently secured to a fly, as by thread, adhesive, or other means, so that the fly and control constitute a unit. The structure of the body of the fly may vary widely as will be appreciated.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Fig. 1 is a plan view showing the control member of the invention before association with a fly;

Fig. 2 is a side elevational view of the same with dot-dash lines to show how it may be bent for purposes of associating it with a fly;

Fig. 3 is a side elevational view showing the control of the invention in association with a fish hook; and Fig. 4 is a side elevational view of the completed fly of the invention.

According to the preferred form of the invention, the control member, indicated generally by 2, is formed from a unitary piece of sheet material although it is to be understood that it may be composed of a plurality of secured-together parts. The construction shown consists of a strip or sheet of metal formed to have a more or less circular body part 4 and what I call an extending lug part 6.

The body part 4 is preferably cup-shaped as is indicated in Fig. 2 although it may be more or less flat and disc-like. Between it and the lug part 6, which may be somewhat wedge-shaped as shown, there may be a reduced connecting portion formed by oppositely-disposed notches 8 which extend inwardly towards one another as shown.

The control member is thus adapted to be bent, approximately if not on this reduced portion, so that the lug assumes the position relative to the body which is shown in dot-dash lines in Fig. 2. The body part 4 may be provided with the representation of an eye, indicated by e, as by painting, merely aperturing the cup, or in any other suitable manner.

There is a hook member, indicated generally by 10, including a longitudinal rod-like support 12 having a hook 11 on one end thereof and a connecting means 14 on its opposite end. The latter may consist of a closed loop or eyelet or other satisfactory part, its function being to readily permit secure and easy fastening of a fish-line to the fly.

In the usual case, the fly travels through the water with the member 12 disposed substantially in a horizontal position and the hook 11 extending downwardly as shown in Figs. 3 and 4. The control member of the invention is attached to the support 12, relatively close to the forward, or connecting, end thereof.

When the body part 4 is cup-shaped, as it is according to the preferred form shown, the concave side thereof faces in the direction of the hook which is, of course, rearwardly.

In any event, it is desirable that the control member be attached to the hook-support by placing the lug part 6 in horizontal adjacency with the rod part 12 and securing the same together in some suitable way. The securing may be by soldering the parts together, which is feasible since they usually are both of metal, by means of a winding of thread, string, or the like, as is indicated by 20 in Fig. 4, or otherwise.

It is usual to enhance the live-like appearance of a fly by associating with what I have called the hook-support a body-forming part 30 which may vary widely in its character. For purposes of decription we have shown said body as consisting of feathers, but it may be cloth or any other material.

The construction of the invention is such that a winding, such as 20, may be used to perform two purposes: that of holding the body 30 onto the hook, as is suggested in Fig. 3, could be sold with support 12 together, all as is clear from Fig. 4.

This, of course, makes for economy and ease in manufacture.

It will be appreciated that the control members above described may be sold separately as units or they may be sold in combination with, and as a component part of, a finished fly. Also, the control members combined with the bare hook, as is suggested in Fig. 3, could be sold without the body part, such as feathers or the like, so that the user could provide such lure as he might desire.

As will be understood, the control member is so arranged that as the fly is drawn on a line through the water, the pressure thereof against the downwardly-depending or vertical body part 4 causes the whole fly to shimmer and thereby be more attractive to a fish.

I have further found that when the line is eased up, the cup 4 acts as a weight so that the forward end of the fly dips relative to the hooked end so that the latter is relatively elevated, all with the result that the lure is made more effective.

Another advantage of the construction just described is that the control member causes the fly, particularly when the user is trolling, to shimmer through the water just below the surface in the manner of a small fish rather than on top of the water or way below its surface as in the case of some devices of the general class to which this invention relates. This has a decided advantage in that the fly thus is more attractive to an especially desirable type of fish.

When the body part 4, at least, is made of metal it may reflect light so as to enhance its appeal. It will also be noted that the general plane of the part 4 is transverse to the axis of the hooks shank 12 as well as below said shank, all to the end that the completed device may travel in its desired effective fashion on the end of the line.

As a further feature I have found that if the body part 4 is of the cup-shape shown, it will prevent the fly from turning on its side as sometimes happens with flies of ordinary construction. That is to say, the control will tend to keep the fly in a properly upright position with the hook depending downwardly in substantially the same vertical plane as the rod or shank of the support, as is desirable.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. A control device adapted to be secured to the shank of a fish-hook comprising, a single piece of metal formed to provide a circular disc-like body part and a relatively narrow elongated lug part extending from the periphery of the body part and provided with notches at opposite edges thereof adjacent said body part, the said body part being concaved and the lug part being disposed at substantially a right angle relative to the body part whereby said lug part may be placed on the shank of a fish-hook and secured thereto by winding a member about said shank and lug part and thereby positioning the body part at substantially a right angle relative to said shank and at a side thereof.

2. A control device adapted to be secured to the shank of a fish-hook comprising, a single piece of metal formed to provide a circular disc-like body part and a relatively narrow elongated lug part extending from the periphery of the body part, the body part being concaved and the lug part being disposed at substantially a right angle relative to the body part whereby the lug part may be placed on the shank of a fish-hook and secured thereby positioning the body part at substantially a right angle relative to the shank and at a side thereof.

KENNETH D. RICHARDS.